US012742682B2

(12) United States Patent
Iwai et al.

(10) Patent No.: US 12,742,682 B2
(45) Date of Patent: Sep. 22, 2026

(54) SPECTROSCOPIC DEVICE, SPECTROSCOPIC METHOD, RAMAN SCATTERING ANALYSIS DEVICE, LUMINESCENCE SPECTROSCOPIC ANALYSIS DEVICE, AND HARMONIC OBSERVATION DEVICE

(71) Applicant: TOHOKU UNIVERSITY, Sendai (JP)

(72) Inventors: Shinichiro Iwai, Sendai (JP); Yohei Kawakami, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 114 days.

(21) Appl. No.: 18/836,234

(22) PCT Filed: Mar. 1, 2022

(86) PCT No.: PCT/JP2022/008650
§ 371 (c)(1),
(2) Date: Aug. 6, 2024

(87) PCT Pub. No.: WO2023/166569
PCT Pub. Date: Sep. 7, 2023

(65) Prior Publication Data
US 2025/0116553 A1 Apr. 10, 2025

(51) Int. Cl.
*G01J 3/45* (2006.01)
*G01J 3/02* (2006.01)
*G01J 3/18* (2006.01)

(52) U.S. Cl.
CPC .............. *G01J 3/45* (2013.01); *G01J 3/0224* (2013.01); *G01J 3/18* (2013.01)

(58) Field of Classification Search
CPC .... G01J 3/45; G01J 3/0224; G01J 3/18; G01J 3/44
See application file for complete search history.

(56) References Cited

U.S. PATENT DOCUMENTS 6,351,307 B1 2/2002 Erskine
2015/0070705 A1 3/2015 Kim et al.
(Continued)

FOREIGN PATENT DOCUMENTS

KR 10-1259327 B1 5/2013
WO WO 2018/146456 A1 8/2018
WO WO-2020196693 A1 * 10/2020 ................ G01J 3/45

OTHER PUBLICATIONS

WO2020196693A1 translation with page numbers (Year: 2020).*
(Continued)

*Primary Examiner* — Tarifur R Chowdhury
*Assistant Examiner* — Carlos Perez-Guzman
(74) *Attorney, Agent, or Firm* — Dority & Manning, P.A.

(57) ABSTRACT

A spectroscopic device according to the present disclosure includes: a light source unit configured to output signal light generated from a sample; a Fourier spectroscopic unit configured to receive the signal light, generate a pair of light beams with any time delay, and output first output light obtained by causing the pair of light beams to interfere with each other; a wavelength dispersion spectroscopic unit configured to detect second output light obtained by dispersing the received first output light according to a wavelength; and a control device configured to extract a component of the signal light in the second output light based on a detection result of the second output light.

5 Claims, 6 Drawing Sheets

(56) References Cited

U.S. PATENT DOCUMENTS

| | | | | |
|---|---|---|---|---|
| 2018/0087961 | A1* | 3/2018 | Noda | G01N 21/274 |
| 2020/0278256 | A1* | 9/2020 | Suzuki | G01J 3/45 |
| 2021/0123808 | A1* | 4/2021 | Polli | G01J 3/2823 |

OTHER PUBLICATIONS

International Search Report (with English translation) received in corresponding Application No. PCT/JP2022/008650, dated May 10, 2022, 6 pages.

Kawakami et al., "Petahertz non-linear current in a centrosymmetric organic superconductor", Nature Communications 11, Article No. 4138, Aug. 18, 2020.

Malevich et al, "Generation of ultrabroadband phase-locked pulse pairs in the ultraviolet by achromatic SHG", 2019 Conference on Lasers and Electro-Optics Europe and European Quantum Electronics Conference (CLEO/Europe-EQEC), Jun. 23, 2019.

Réhault et al., "Two-dimensional electronic spectroscopy with birefringent wedges", Review of Scientific Instruments, Dec. 9, 2014, vol. 85, pp. 123107-1-123107-10.

* cited by examiner

SPECTROSCOPIC DEVICE, SPECTROSCOPIC METHOD, RAMAN SCATTERING ANALYSIS DEVICE, LUMINESCENCE SPECTROSCOPIC ANALYSIS DEVICE, AND HARMONIC OBSERVATION DEVICE

CROSS-REFERENCE TO RELATED APPLICATIONS

This application is the U.S. National Stage entry of International Application No. PCT/JP2022/008650, filed on Mar. 1, 2022, which is hereby incorporated herein by reference in its entirety for all purposes.

TECHNICAL FIELD

The present invention relates to a spectroscopic device, a spectroscopic method, a Raman scattering analysis device, a luminescence spectroscopic analysis device, and a harmonic observation device.

BACKGROUND ART

Spectroscopy is a technique of selecting a component of light having a desired wavelength from components of input light and measuring a light intensity of the component. As spectroscopic methods, a method using a wavelength dispersion element that disperses wavelength components of light such as a prism or a diffraction grating (wavelength dispersion spectroscopy) and a method of performing Fourier transform on an interference pattern (interferogram) of interference light obtained by an interferometer that causes interference with input light (Fourier spectroscopy) are known. A spectroscopic device including a wavelength dispersion element and an interferometer is called a spectrometer.

CITATION LIST

Non Patent Literature

NPL 1: Y. Kawakami, et al., 'Petahertz non-linear current in a centrosymmetric organic superconductor' Nature Communications 11, Article number: 4138 (2020), 18 Aug. 2020

SUMMARY OF INVENTION

Technical Problem

When performing spectroscopy by using a spectrometer, in addition to normally used first-order diffracted light of input light, stray light is generated due to an influence of zero-order reflected light, second-order diffracted light, and other scattered light generated in the spectrometer. In such an optical device, the stray light having a wavelength component other than an original wavelength is detected outside an expected optical path. In a case where strong light such as a laser is used as a light source for spectroscopy, it is generally known that it is more difficult to detect weak light such as Raman scattered light, luminescence, and a harmonic due to an influence of the stray light.

Among spectroscopic methods, Raman spectroscopy in which a substance is evaluated using Raman scattered light is known. The Raman spectroscopy is a method of measuring the Raman scattered light output from the substance when light is emitted to the substance. The Raman scattered light is light that is output with a wavelength different from that of emission light due to interaction of input light inside the substance. In the Raman spectroscopy, it is necessary to detect weak Raman scattered light having a wavelength relatively close to a wavelength of a laser from the substance to which the laser is emitted.

In such a case, spectroscopy using a diffraction grating or spectroscopy using a Fabry-Perot interferometer, which is a type of Fourier spectroscopy, is repeated two or several times to improve frequency resolution and reduce an influence of laser light on the Raman scattered light. In addition, in the spectroscopy based on the laser light, the influence of the laser light is reduced by a filter (the same principle as the Fabry-Perot interferometer) using an interference effect of a dielectric multilayer film. However, according to these spectroscopic methods, a wide wavelength range cannot be detected at once.

Among spectroscopic methods, a luminescence spectroscopic method is known in which excitation light is emitted to a sample to observe luminescence generated when excited electrons inside a substance return to a ground state. According to the luminescence spectroscopic method, it is possible to measure an elemental composition of the sample and perform quantitative analysis for determining an amount of a component in the sample by performing spectral analysis of various types of luminescence generated from the sample. However, when the various types of luminescence generated from the sample are measured, in a case where the luminescence and energy of the excitation light are close to each other, an influence of stray light is large, and accurate measurement is difficult.

It is also known that a harmonic is generated when laser light is input to a superconducting material (for example, see NPL 1). When detecting a harmonic of a substance, it is necessary to simultaneously measure a wide wavelength range in which an intensity of incident light is high and a wavelength of measured light is a fraction of a wavelength of the incident light (with photon energy of several times higher). However, when a harmonic output from a substance is observed using a diffraction grating or the like, a short wavelength side of low-order diffracted light and a long wavelength side of high-order diffracted light are diffracted in the same direction, and thus it is difficult to select and observe diffracted light by wavelength.

An object of the present invention is to provide a spectroscopic device, a spectroscopic method, a Raman scattering analysis device, a luminescence spectroscopic analysis device, and a harmonic observation device that can detect a component of light output from a sample while reducing an influence of stray light over a wide wavelength range based on a simple device configuration.

Solution to Problem

One aspect of the present disclosure provides a spectroscopic device including: a light source unit configured to output signal light generated from a sample; a Fourier spectroscopic unit configured to receive the signal light, generate a pair of light beams with any time delay, and output first output light obtained by causing the pair of light beams to interfere with each other; a wavelength dispersion spectroscopic unit configured to detect second output light obtained by dispersing the received first output light according to a wavelength; and a control device configured to extract a component of the signal light in the second output light based on a detection result of the second output light.

The control device in the present invention may include a control unit configured to remove a stray light component and extract the component of the signal light in the second output light based on the detection result of the second output light, and a display unit configured to display a display image in which the detection result is imaged and the component of the signal light is extracted based on image processing.

The control unit in the present invention may control the Fourier spectroscopic unit, generate an interferogram corresponding to all wavelengths in the second output light based on a detection value of the second output light detected by adjusting the time delay, perform Fourier transform on the interferogram, calculate a Fourier spectrum corresponding to the all wavelengths in the second output light, and extract the component of the signal light based on image processing on the Fourier spectrum and the detection value of the second output light.

The Fourier spectroscopic unit in the present invention may include a first polarization adjustment unit configured to receive the signal light, adjust a polarization direction by applying a predetermined rotation angle in an oblique direction with respect to a polarization plane as viewed from an incident direction of the signal light, and output the signal light, a delay unit provided downstream of the first polarization adjustment unit, the delay unit being configured to apply a time delay to input light and output the input light, a first adjustment unit provided adjacent to and downstream or upstream of the delay unit, the first adjustment unit being configured to apply a relative time difference between a vertical component and a horizontal component of the input light and output output light, and a second polarization adjustment unit provided downstream of the delay unit and the first adjustment unit, the second polarization adjustment unit being configured to receive the output light, allow passage of a component in an oblique direction with respect to the polarization plane as viewed from an incident direction of the output light, and generate and output the pair of light beams.

The wavelength dispersion spectroscopic unit in the present invention may include a spectroscopic element configured to disperse the first output light into light components of respective wavelengths, and a detection unit configured to individually detect intensities of the respective light components dispersed by the spectroscopic element.

Another aspect of the present invention provides a spectroscopic method including: outputting, by a light source unit, a signal light generated from a sample; inputting the signal light to a Fourier spectroscopic unit to generate a pair of light beams with any time delay, and outputting first output light obtained by causing the pair of light beams to interfere with each other; inputting the first output light to a wavelength dispersion spectroscopic unit to detect second output light obtained by dispersing the first output light according to a wavelength; and extracting, using a control device, a component of the signal light in the second output light based on a detection result of the second output light.

Another aspect of the present invention provides a Raman scattering spectroscopic device including: a light source unit configured to output Raman scattered light generated from a sample; a Fourier spectroscopic unit configured to receive the Raman scattered light, generate a pair of light beams with any time delay, and output first output light obtained by causing the pair of light beams to interfere with each other; a wavelength dispersion spectroscopic unit configured to detect second output light obtained by dispersing the received first output light according to a wavelength; and a control device configured to extract a component of the Raman scattered light in the second output light based on a detection result of the second output light.

Another aspect of the present invention provides a luminescence spectroscopic analysis device including: a light source unit configured to output luminescence generated from a sample; a Fourier spectroscopic unit configured to receive the luminescence, generate a pair of light beams with any time delay, and output first output light obtained by causing the pair of light beams to interfere with each other; a wavelength dispersion spectroscopic unit configured to detect second output light obtained by dispersing the received first output light according to a wavelength; and a control device configured to extract a component of the luminescence in the second output light based on a detection result of the second output light.

Another aspect of the present invention provides a harmonic observation device including: a light source unit configured to output a harmonic generated from a sample; a Fourier spectroscopic unit configured to receive the harmonic, generate a pair of light beams with any time delay, and output first output light obtained by causing the pair of light beams to interfere with each other; a wavelength dispersion spectroscopic unit configured to detect second output light obtained by dispersing the received first output light according to a wavelength; and a control device configured to extract a component of the harmonic in the second output light based on a detection result of the second output light.

Advantageous Effects of Invention

According to the present invention, a wavelength component of light output from a substance can be detected based on a simple device configuration.

BRIEF DESCRIPTION OF DRAWINGS

FIG. 3 schematically shows a principle of the Fourier spectroscopic unit.

DESCRIPTION OF EMBODIMENTS

Hereinafter, an embodiment of a spectroscopic device, a spectroscopic method, a Raman scattering analysis device, a luminescence spectroscopic analysis device, and a harmonic observation device according to the present invention will be described.

Figure 1:
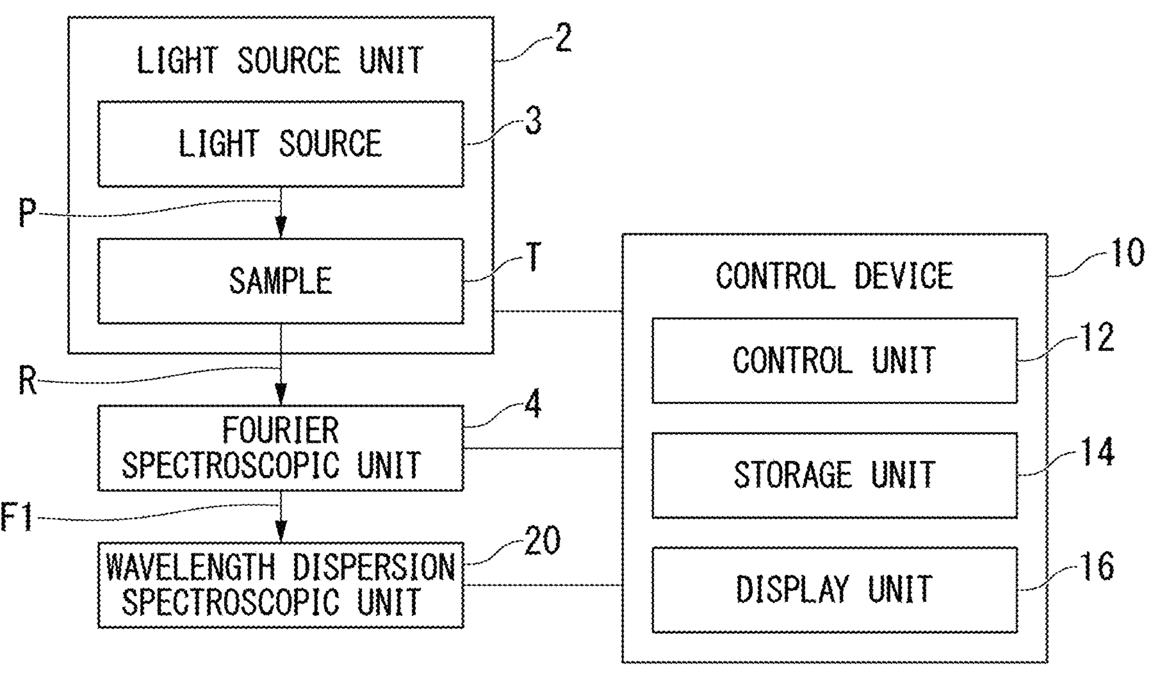
FIG. 1 is a block diagram showing a configuration of a spectroscopic device according to an embodiment of the present invention.

As shown in FIG. 1, a spectroscopic device 1 includes, for example, a light source unit 2, a Fourier spectroscopic unit 4 that receives signal light R output from the light source unit 2 and outputs first output light F1, a wavelength dispersion spectroscopic unit 20 that receives the first output light F1 and detects second output light F2, and a control device 10 that controls the light source unit 2, the Fourier spectroscopic unit 4, and the wavelength dispersion spectroscopic unit 20 and performs calculation based on a detection result.

For example, the light source unit 2 outputs the signal light R based on emission light P. The light source unit 2 may output the signal light R under control of the control device 10. The light source unit 2 includes, for example, a light source 3 that generates laser light, and a sample (emitting substance) T that generates the signal light R such as Raman scattered light, luminescence, and a harmonic when the laser light is emitted thereto. The light source 3 outputs the emission light P having a predetermined wavelength according to the sample T.

The light source 3 outputs the emission light P with any wavelength, any output, and any emission time. For example, the light source 3 may output the pulsed emission light P having a predetermined wavelength and a predetermined pulse width, or may output the emission light P as continuous light having a predetermined wavelength. The emitting substance (also referred to as the sample T) is disposed on an optical axis of the emission light P output from the light source 3.

The emitting substance has a property of generating the signal light R such as Raman scattered light, luminescence, and a harmonic when laser light is emitted thereto. Examples of the emitting substance include a substance having optical nonlinearity, a substance having luminescent properties, and a superconducting substance. The emitting substance outputs the signal light R when the emission light P is received.

The signal light R is, for example, light including Raman scattered light, luminescence, and a harmonic. The signal light R includes light of a plurality of wavelengths characteristic of the sample T. The sample T can be analyzed by dispersing and evaluating light in the signal light R. The emitting substance T is an example, and may be replaced with another substance as long as the signal light R can be generated based on the emission light P. The signal light R output from the emitting substance is input to the Fourier spectroscopic unit 4.

The Fourier spectroscopic unit 4 generates a pair of light beams that travel coaxially from the signal light R. The Fourier spectroscopic unit 4 is an optical delay circuit that receives the signal light R, generates a pair of light beams P1 and P2 (see FIG. 3) with any time delay, causes the pair of light beams P1 and P2 to interfere with each other to generate interference light (first output light F1), and outputs the interference light. The Fourier spectroscopic unit 4 receives the signal light R and outputs the pair of light beams P1 and P2 having a relative phase (time) difference. The Fourier spectroscopic unit 4 is set in the atmosphere. The Fourier spectroscopic unit 4 includes, for example, a birefringent optical element that generates an optical delay according to a difference in a refractive index depending on a polarization direction.

The Fourier spectroscopic unit 4 allows the received signal light R to pass through the birefringent optical element, generates the pair of light beams P1 and P2 having a time difference, and outputs the pair of light beams P1 and P2 in a coaxial optical path. The Fourier spectroscopic unit 4 functions as an interferometer that changes a state of output interference light by adjusting the relative phase difference applied to the pair of light beams P1 and P2. The Fourier spectroscopic unit 4 has a configuration that is less likely to be affected by mechanical accuracy or disturbance due to the birefringent optical element. Therefore, when the Fourier spectroscopic unit 4 has the coaxial optical path using the birefringent optical element, time accuracy thereof is 200 times that of a mechanical interferometer such as a Michelson interferometer in principle. The first output light F1 output from the Fourier spectroscopic unit 4 is input to the wavelength dispersion spectroscopic unit 20.

The wavelength dispersion spectroscopic unit 20 includes, for example, a multi-channel spectrometer that detects the second output light F2 obtained by dispersing the received first output light F1 according to a wavelength. The wavelength dispersion spectroscopic unit 20, for example, emits the first output light F1 to a diffraction grating, separates the first output light F1 for each wavelength based on diffraction, and generates the second output light F2. The wavelength dispersion spectroscopic unit 20 detects intensities of a plurality of light beams in the second output light F2 for each wavelength. The wavelength dispersion spectroscopic unit 20 outputs a detection value to the control device 10.

The control device 10 extracts a component of the signal light R in the second output light F2 based on a detection result of the second output light F2. A calculation method of the control device 10 will be described later.

The control device 10 includes, for example, a control unit 12 that outputs a calculation result based on the detection value detected by the wavelength dispersion spectroscopic unit 20 and generates a display image to be subjected to image processing, a storage unit 14 that stores various types of data necessary for processing, and a display unit 16 that outputs the generated display image. The control device 10 is implemented by an information processing terminal such as a personal computer.

The control unit 12 performs calculation processing, and image processing and display control of the display image on the display unit 16. In addition, the control unit 12 controls the Fourier spectroscopic unit 4 to be described later to adjust the first output light F1. The control unit 12 performs control related to detection of the wavelength dispersion spectroscopic unit 20. The control unit 12 controls the light source unit 2 to adjust the signal light R.

The control unit 12 is implemented by, for example, a hardware processor such as a central processing unit (CPU) executing a program (software). A part of all of these components may be implemented by hardware (circuit unit; including circuitry) such as a large scale integration (LSI), an application specific integrated circuit (ASIC), a field-programmable gate array (FPGA), and a graphics processing unit (GPU), or may be implemented by cooperation of software and hardware.

The program may be stored in advance in a storage device such as a hard disk drive (HDD) or a flash memory or the storage unit 14, or may be stored in a removable storage medium such as a DVD (registered trademark) or a CD-ROM and installed by mounting the storage medium in a drive device. The above-described processing may be executed not only by the control unit 12 but also by a computer on a server by cloud computing. The above-described processing may be distributed in a plurality of distributed computers to execute functions.

The storage unit 14 is a storage device such as an HDD or a flash memory. The storage unit 14 stores data necessary for controlling a device to be controlled and a program for executing processing of the control unit 12. The data and the program may be stored in an external server connected to a network.

The display unit 16 displays a display image in which the detection result is imaged and the component of the signal light is extracted based on image processing. An image of an observation result generated based on the detection value is displayed on the display unit 16. As the display unit 16, for example, a display device such as a liquid crystal display, a light emitting diode (LED) display, an organic electroluminescence (EL) display, a digital mirror device, or a plasma display is used. The display unit 16 may be implemented by an information processing terminal provided separately from the control device 10, such as a smartphone or a tablet terminal.

Figure 2:
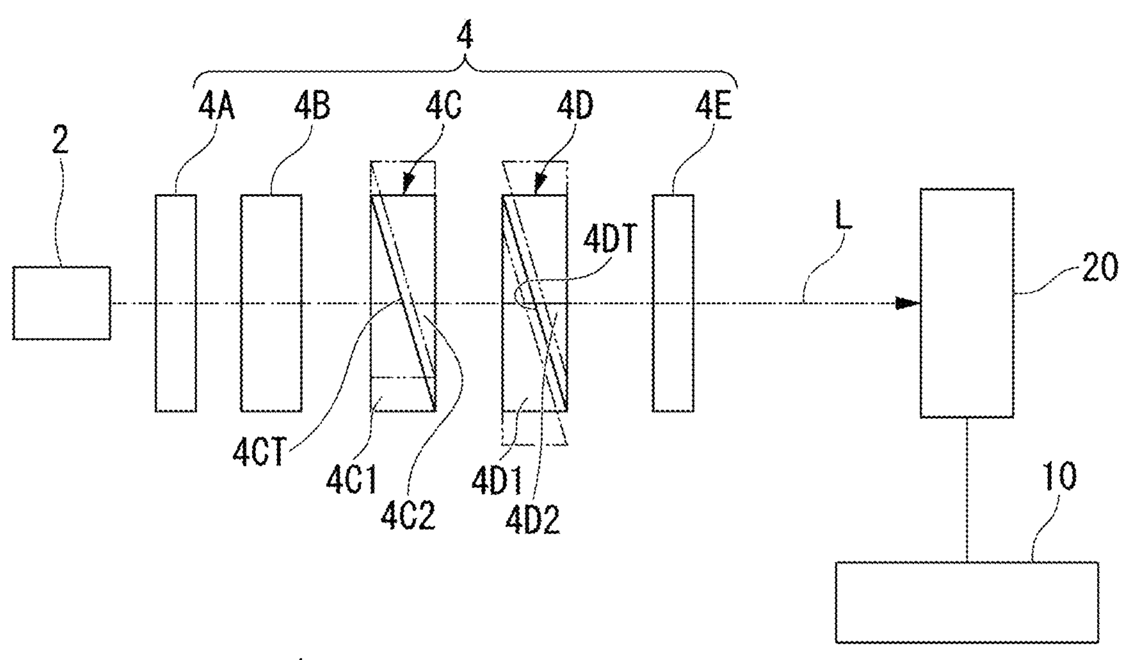
FIG. 2 schematically shows a configuration of a Fourier spectroscopic unit.
Figure 3:
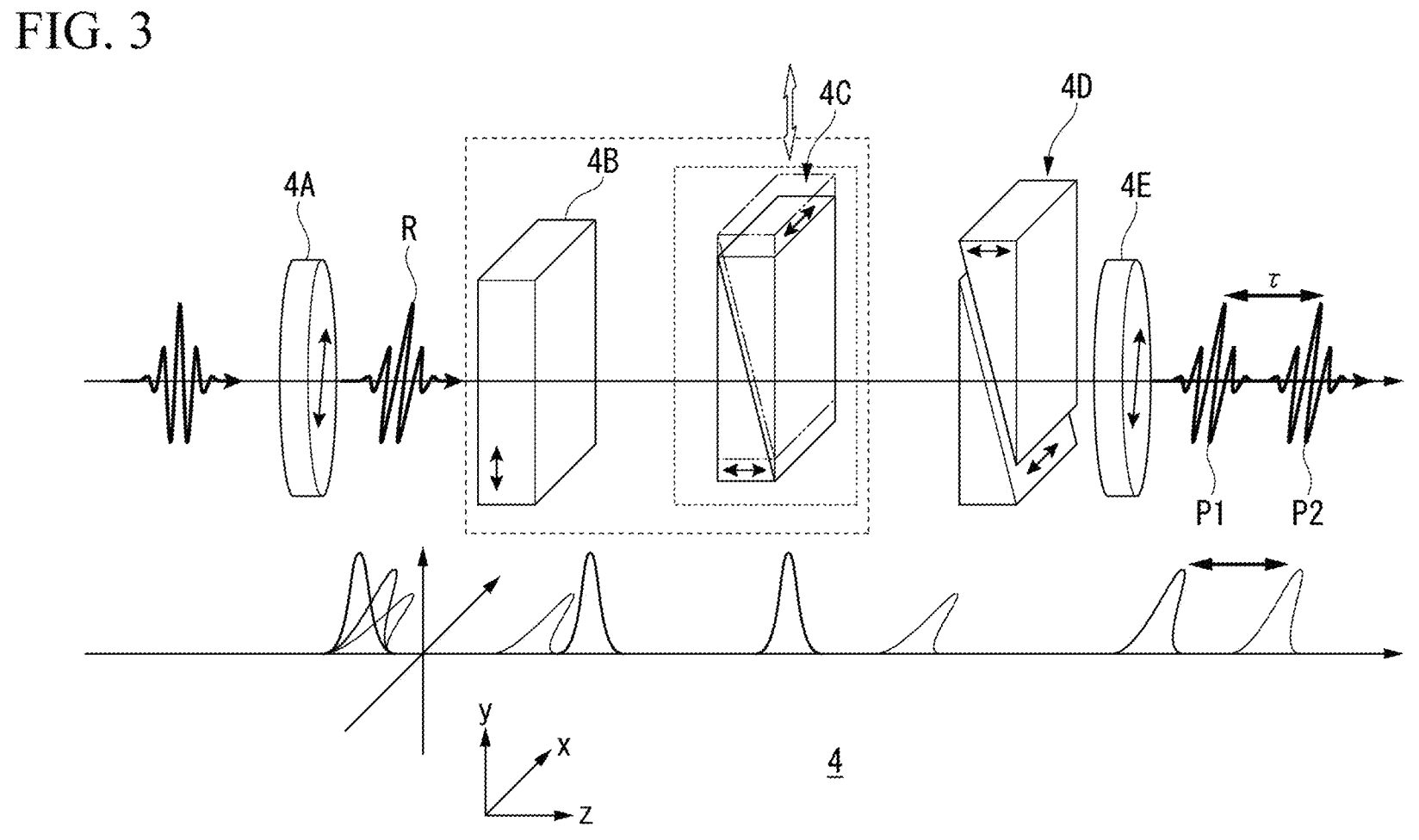

FIGS. 2 and 3 show a configuration of the Fourier spectroscopic unit 4. An example is shown in which a device of an optical system "translating wedge-based identical pulses eNcoding system (TWINS)" that generates a pair of light beams using uniaxial crystal birefringence is used as the Fourier spectroscopic unit 4. The above-described optical system device (TWINS) is mainly used for pump-probe measurement and the like.

The TWINS includes an optical delay circuit that uses a birefringent optical element and generates an optical delay according to a difference in a refractive index depending on a polarization direction. Here, birefringence is a phenomenon in which, when a light beam passes through a substance having a crystal structure, the light beam is divided into two light beams depending on a polarization state thereof. Light input to the TWINS is birefringed into a pair of light beams and output in a coaxial optical path. The TWINS is characterized by being hardly affected by mechanical accuracy or disturbance since a mechanical configuration using the birefringent optical element is minimal.

In the Fourier spectroscopic unit 4, a first polarization adjustment unit 4A is provided downstream in a direction of an optical axis L of the signal light R output from the light source unit 2. A delay unit 4B is provided downstream of the first polarization adjustment unit 4A. A first adjustment unit 4C is provided adjacent to and downstream of the delay unit 4B. The first adjustment unit 4C may be provided adjacent to and upstream of the delay unit 4B. That is, the first adjustment unit 4C is provided adjacent to and downstream or upstream of the delay unit 4B.

A second adjustment unit 4D is provided downstream of the delay unit 4B and the first adjustment unit 4C. A second polarization adjustment unit 4E is provided downstream of the second adjustment unit 4D. The second polarization adjustment unit 4E is provided downstream of the delay unit 4B, the first adjustment unit 4C, and the second adjustment unit 4D. A three-dimensional coordinate axis shown in FIG. 3 is an example showing a relative relationship, and the invention is not limited thereto.

The first polarization adjustment unit 4A receives light, applies a predetermined rotation angle in an oblique direction with respect to an electric field oscillation direction (polarization plane) as viewed from a light incident direction, rotates a polarization direction, and outputs the light. The first polarization adjustment unit 4A is formed of, for example, a half-wave plate. The first polarization adjustment unit 4A receives the signal light R from upstream and outputs, from downstream, the signal light whose polarization direction is adjusted to an oblique direction (for example, a direction at 45 degrees from an x-axis in an xy plane in FIG. 3) with respect to the polarization plane as viewed from the light incident direction (for example, a positive z-axis direction in FIG. 3).

The delay unit 4B outputs the input light with a time delay. The delay unit 4B is formed of, for example, an α-BBO (α-$BaB_2O_4$) crystal in a rectangular plate shape. The α-BBO of the delay unit 4B is, for example, a uniaxial crystal formed in y-cut having predetermined optical characteristics. The y-cut is performed such that a y-axis direction of the uniaxial crystal in FIG. 3 coincides with a direction of an extraordinary refractive index of the uniaxial crystal. The a-BBO has high birefringence in a transmission wavelength range of 190 nm to 3500 nm. For example, signal light whose polarization direction is adjusted to 45 degrees from the x-axis as viewed from the light incident direction is input to the delay unit 4B. The delay unit 4B further delays a phase of the signal light and outputs the signal light. A delay amount of the phase in the delay unit 4B is adjusted by a plate thickness (for example, 3.5 mm) of the delay unit 4B in the direction of the optical axis L.

The first adjustment unit 4C applies a relative phase difference between a vertical component and a horizontal component of input light and outputs output light. The first adjustment unit 4C includes, for example, a first wedge portion 4C1 and a second wedge portion 4C2 each formed in a wedge shape as viewed in a direction orthogonal to the optical axis L (for example, a y direction in FIG. 3). The first adjustment unit 4C is formed in a rectangular plate shape by combining the first wedge portion 4C1 upstream and the second wedge portion 4C2 downstream. Between the first wedge portion 4C1 and the second wedge portion 4C2, a parallel adjacent space 4CT is formed in an oblique direction with respect to the direction orthogonal to the optical axis L.

The first wedge portion 4C1 is formed of, for example, a z-cut a-BBO crystal. The z-cut is performed such that a z-axis direction of the uniaxial crystal in FIG. 3 coincides with the direction of the extraordinary refractive index of the uniaxial crystal. The first wedge portion 4C1 is formed to have a predetermined gradient (for example, a ratio of a plate surface length to a plate thickness is 3.5 mm/25 mm, and an apex angle is 7 degrees). The second wedge portion 4C2 is formed of, for example, an x-cut x-BBO crystal having a refractive index different from that of the first wedge portion 4C1. The x-cut is performed such that an x-axis direction of the uniaxial crystal in FIG. 3 coincides with the direction of the extraordinary refractive index of the uniaxial crystal. The second wedge portion 4C2 is formed to have a predetermined gradient (for example, 3.5 mm/25 mm and an apex angle of 7 degrees).

The first adjustment unit 4C is set such that the first wedge portion 4C1 and the second wedge portion 4C2 are integrally movable by a predetermined width along a direction in which a thickness of each of the first wedge portion 4C1 and the second wedge portion 4C2 changes (for example, in the y direction in FIG. 3, which is referred to as a wedge direction for simplicity). Movement of the first adjustment unit 4C is mechanically performed according to a command from the control device 10. An optical path length in the first wedge portion 4C1 and an optical path length in the second wedge portion 4C2 are changed by integrally moving the first wedge portion 4C1 and the second wedge portion 4C2 along the wedge direction. Accordingly, an optical path length along the optical axis L in the first adjustment unit 4C can be adjusted, and the phase difference (time difference: t) relatively applied to the vertical component and the horizontal component of the input light can be adjusted to output the output light. Assuming that a movement difference of the first adjustment unit 4C from an initial position is Ax, the relative time difference t between the vertical component and the horizontal component of the input light (a relative phase difference if multiplied by (2π/optical oscillation period)) can be adjusted based on, for example, a relationship of the following equation (1).

[Formula 1]

$$\tau = \Delta x \tan\theta(1/v_{ge} - 1v_{go}) \quad (1)$$

In the above-described equation, θ is the apex angle of the wedge portion, $v_{ge}$ is a group velocity of an extraordinary ray along a fast axis, and $v_{go}$ is a group velocity of an ordinary ray along a slow axis. Here, $v_{ge}$ and $v_{go}$ are values well known for each type of the uniaxial crystal. For simplicity, a case where the apex angles of the first wedge portion 4C1 and the second wedge portion 4C2 are equal is shown as an example.

Further, the second adjustment unit 4D may be installed in front of or behind the first adjustment unit. For example, when the signal light R is pulse light, the second adjustment unit 4D adjusts a pulse width of the input light. The second adjustment unit 4D adjusts the pulse width of the pulsed light changed by passing through the delay unit 4B and the first adjustment unit 4C. Similarly to the first adjustment unit 4C, for example, the second adjustment unit 4D includes a first wedge portion 4D1 and a second wedge portion 4D2 that are each formed in a wedge shape as viewed in the direction orthogonal to the optical axis L (for example, the y direction in FIG. 3). The second adjustment unit 4D is formed in a rectangular plate shape by combining the first wedge portion 4D1 upstream and the second wedge portion 4D2 downstream.

Between the first wedge portion 4D1 and the second wedge portion 4D2, a parallel adjacent space 4DT is formed in an oblique direction with respect to the direction orthogonal to the optical axis L. The first wedge portion 4D1 is formed of, for example, an x-cut α-BBO crystal. The first wedge portion 4D1 is formed to have a predetermined gradient (for example, 3.5 mm/25 mm and an apex angle of 7 degrees). The second wedge portion 4D2 is formed of, for example, a z-cut α-BBO crystal having a refractive index different from that of the first wedge portion 4D1. The second wedge portion 4D2 is formed to have a predetermined gradient (for example, 3.5 mm/25 mm and an apex angle of 7 degrees).

The first wedge portion 4D1 and the second wedge portion 4D2 are provided to be movable by a predetermined width along the adjacent space 4DT. A pulse width of output pulsed light is adjusted by relatively moving the first wedge portion 4D1 and the second wedge portion 4D2 along the adjacent space 4DT. The second adjustment unit 4D is not necessarily essential.

The second polarization adjustment unit 4E allows passage of a component in an oblique direction with respect to a polarization plane as viewed from an incident direction of received output light, and generates and outputs the pair of light beams P1 and P2 having the relative phase difference (time difference). The second polarization adjustment unit 4E is formed of a polarizing plate provided such that the polarization direction is the oblique direction (for example, a direction at 45 degrees from the x-axis in the xy plane in FIG. 3) with respect to the polarization plane as viewed from the light incident direction (for example, the positive z-axis direction in FIG. 3). The pair of light beams P1 and P2 output from the second polarization adjustment unit 4E are output as the first output light F1 that is interference light.

In the first adjustment unit 4C, the time difference between the pair of light beams P1 and P2 output from the second polarization adjustment unit 4E is adjusted by adjusting the time difference in the output light, and the first output light F1 that is interference light is generated. The generated first output light F1 is input to the wavelength dispersion spectroscopic unit 20. The above-described configuration of the Fourier spectroscopic unit 4 is an example, and another configuration may be used as long as the interference light of the pair of light beams is generated from the signal light R and output, and the relative time difference between the pair of light beams can be individually detected.

Figure 4:
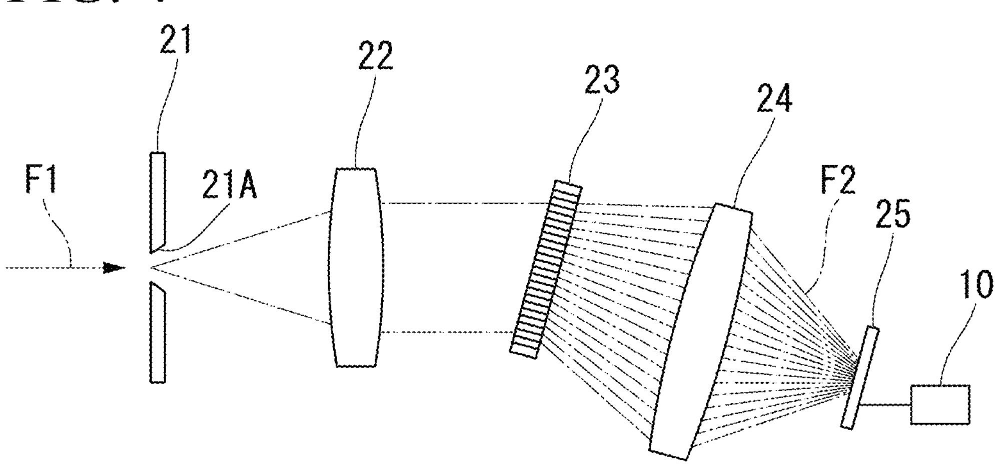
FIG. 4 schematically shows a configuration of a wavelength dispersion spectroscopic unit.

As shown in FIG. 4, the wavelength dispersion spectroscopic unit 20 is provided with a slit 21 upstream in an optical path. A collimating lens 22 is provided downstream of the slit 21. A spectroscopic element 23 is provided downstream of the collimating lens 22. A focus lens 24 is provided downstream of the spectroscopic element 23. A detection unit 25 is provided downstream of the focus lens 24.

The slit 21 has a gap 21A through which light to be measured passes. The slit 21 changes a wavelength resolution by adjusting a width of the gap 21A. The first output light F1 is incident from the slit 21. The collimating lens 22 is a transmissive lens that receives diffused light input from the slit 21, converts the light into parallel light, and outputs the parallel light. The collimating lens 22 adjusts a width of the input light according to a size of the spectroscopic element 23. A reflective mirror may be used instead of the collimating lens 22. The light output from the collimating lens 22 is incident on the spectroscopic element 23.

The spectroscopic element 23 diffracts the first output light and disperses the first output light into light components of respective wavelengths. The spectroscopic element 23 is, for example, a diffraction grating. The diffraction grating is an optical element that has a lattice pattern formed regularly and disperses light into components of wavelengths by using diffraction of light input to the lattice pattern. The spectroscopic element 23 shown in the drawing is of a transmissive type, and may also be of a reflective type. The spectroscopic element 23 receives the first output light F1 and generates the second output light F2 obtained by dispersing the first output light F1 according to the wavelength. The light dispersed by the spectroscopic element 23 is input to the focus lens 24.

The focus lens 24 is, for example, a transmissive lens that receives the dispersed light components and aligns a focus of output light components with a light-receiving unit of the detection unit 25. A reflective mirror may be provided instead of the focus lens 24. The detection unit 25 individually detects an intensity of each light component dispersed by the spectroscopic element 23. The detection unit 25 includes, for example, an image sensor in the light-receiving unit. The detection unit 25 receives the second output light F2 via the focus lens 24 and individually detects the intensity of each light component of the second output light F2. The detection unit 25 outputs a detection value of the intensity of the light component to the control device 10 based on the image sensor. The above-described configuration of the wavelength dispersion spectroscopic unit 20 is an example, and the wavelength dispersion spectroscopic unit 20 may have another configuration as long as the first output light is dispersed into the light components of each wavelength and the intensity of each dispersed light component of each wavelength can be individually detected.

Next, processing of a calculation method executed in the control device 10 will be described. The control unit 12 adjusts the first output light F1 output from the Fourier spectroscopic unit 4 and calculates the light intensity for each wavelength based on the detection value of the detection unit 25 provided in the wavelength dispersion spectroscopic unit 20.

The control unit 12 controls the Fourier spectroscopic unit 4 to fix the time difference t between the pair of light beams P1 and P2 and generate the first output light F1 that is the interference light of the pair of light beams P1 and P2. The wavelength dispersion spectroscopic unit 20 receives the first output light F1 and detects, in the detection unit 25, the second output light F2 obtained by dispersing the first output light F1 according to the wavelength. A detection result is stored in the storage unit 14. The control unit 12 controls the Fourier spectroscopic unit 4, changes the time difference t between the pair of light beams P1 and P2, and repeats processing of detecting the second output light F2 in the detection unit 25.

The control unit 12 records a relationship between the time difference t of the Fourier spectroscopic unit 4 and the second output light F2 using a relationship equation (for example, the above-described equation (1)) between a control signal for adjusting the time difference t of the Fourier spectroscopic unit 4 and an adjustment amount of the Fourier spectroscopic unit 4. Accordingly, a spectrum of the second output light F2 is obtained for the certain time difference t. When the spectrum of the second output light F2 is measured for all time differences s t, an interference pattern called an interferogram (interference figure) corresponding to all wavelengths in the second output light F2 is obtained. The interferogram is obtained by recording an optical path difference based on the time difference t on a horizontal axis and an interference light intensity on a vertical axis. By performing Fourier transform on the interferogram, it is possible to calculate a Fourier spectrum corresponding to all wavelengths in the second output light F2.

The control unit 12 extracts the detection value of the second output light F2 as a function of the time difference t based on the detection result of the detection unit 25, and generates the interferogram corresponding to all wavelengths in the second output light F2. The control unit 12 performs Fourier transform on the interferogram and calculates a Fourier spectrum corresponding to all wavelengths in the second output light F2.

Next, the control unit 12 performs image processing based on the detection result detected by the detection unit 25 of the wavelength dispersion spectroscopic unit 20, and generates a first display image in which the light intensity is plotted. The control unit 12 displays the first display image on the display unit 16.

Figure 5:
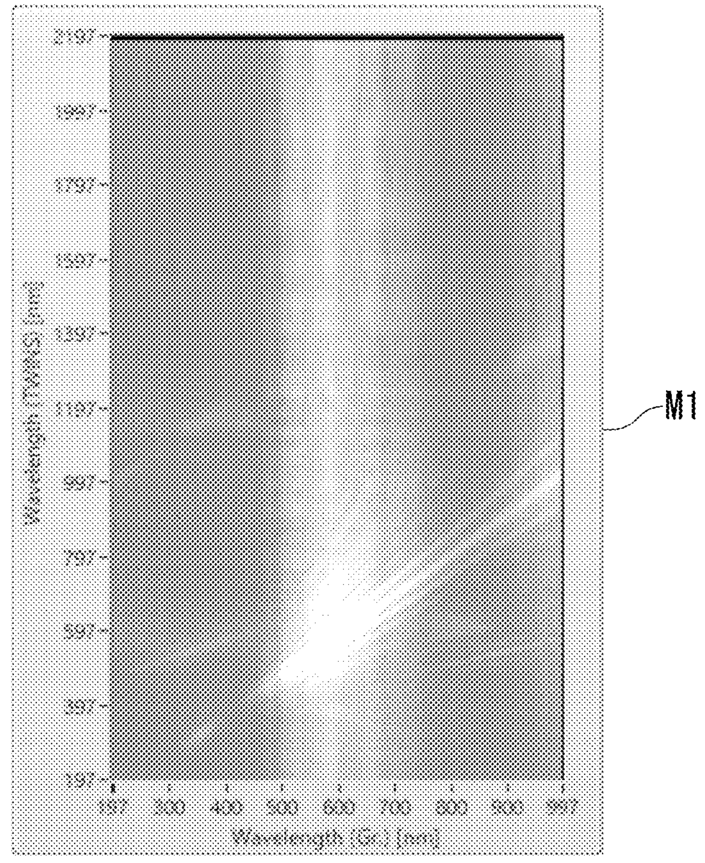
FIG. 5 shows an example of a first display image displayed on a display unit.

As shown in FIG. 5, a first display image M1 is subjected to image processing such that the light intensity is two-dimensionally mapped spectrally by luminance with a wavelength detected by the detection unit 25 serving as a horizontal axis and a wavelength obtained by the Fourier transform on the interferogram serving as a vertical axis. The first display image M1 shows a two-dimensional spectral mapping diagram of a light intensity detected when a harmonic of a copper oxide high-temperature superconductor $YBa_2Cu_3O_y$ (emitting substance: sample T) is measured as the signal light R.

In the first display image M1, the component of the signal light R generated from the emitting substance T and a stray light component are shown. An observation result of the stray light component differs depending on respective spectroscopic methods of Fourier spectroscopy and wavelength dispersion spectroscopy, whereas an observation result of the component of the signal light R is common regardless of the spectroscopic methods. That is, the component of the signal light R in the first display image M1 is a component commonly contained in the detected spectrum (horizontal axis) of the second output light F2 and the Fourier spectrum (vertical axis) obtained by the Fourier transform on the interferogram. That is, the component of the signal light R in the first display image M1 is a linear bright line shown on a straight line indicated by Y=X along which wavelength values of the vertical axis and the horizontal axis are the same. In the first display image M1, values other than the component of the signal light R are the stray light component.

The stray light component includes stray light generated in the Fourier spectroscopic unit 4, stray light generated in the wavelength dispersion spectroscopic unit 20, white noise, and an artifact to be described later generated based on calculation. For example, in FIG. 5, the stray light component has a wavelength of 400 nm or less on the horizontal axis, and appears with a wavelength in the vicinity of 600 nm and 1200 nm on the vertical axis. The stray light component includes zero-order reflected light reflected from the emitting substance T, second-order diffracted light generated in the wavelength dispersion spectroscopic unit 20, and other stray light components.

It is possible to extract only a signal component of the true signal light R by removing a noise component such as stray light from the two-dimensional map shown in the first display image M1.

Figure 6:
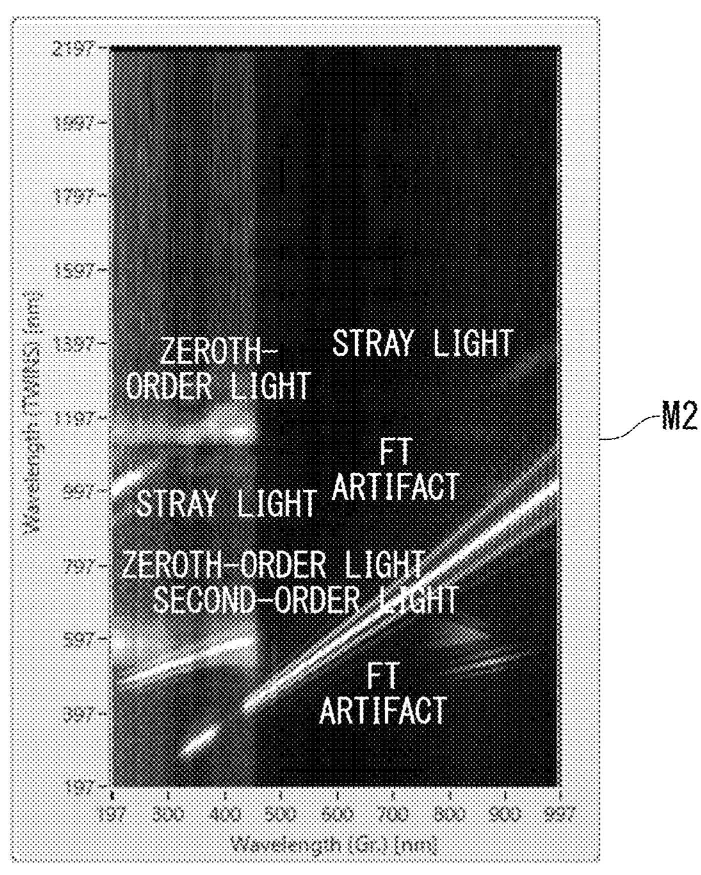
FIG. 6 shows an example of a second display image displayed on the display unit.

As shown in FIG. 6, the control unit 12 generates a second display image M2 by removing white noise from the first display image M1. The white noise is a spectral component distributed with substantially the same intensity in an entire region in the first display image M1, which does not depend on the wavelength on the vertical axis or the wavelength on the horizontal axis. The control unit 12 removes the spectral component of the white noise from the entire region in the first display image M1 to generate the second display image M2. In the second display image M2, in addition to the signal based on the true light, the stray light of the Fourier spectroscopic unit 4 and the wavelength dispersion spectroscopic unit 20, the artifact generated based on calculation, and the like are shown.

Figure 7:
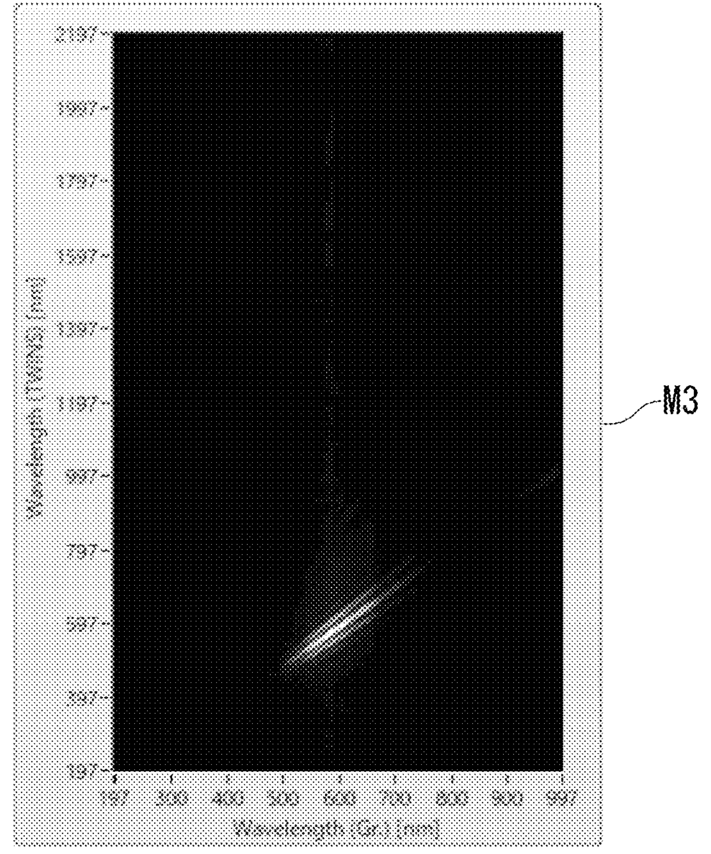
FIG. 7 shows an example of a third display image displayed on the display unit.

As shown in FIG. 7, the control unit 12 generates a third display image M3 in which the stray light component in the second output light F2 is removed from the second display image M2.

On a straight line of Y (longitudinal axis; TWINS wavelength)=X (transverse axis; grating spectrometer wavelength) in the third display image M3, light intensity information is indicated by luminance. The control unit 12 displays, on the display unit 16, the third display image M3 in which the component of the signal light R is extracted based on image processing. In the third display image M3, a component of the straight line of Y=X indicating the component of the signal light R and an artifact are shown. The control unit 12 extracts, from the third display image M3, data of the component of the signal light R plotted on the straight line of Y=X. The control unit 12 displays, on the display unit 16, a fourth display image M4 of the light intensity of the extracted component of the signal light R.

Figure 8:
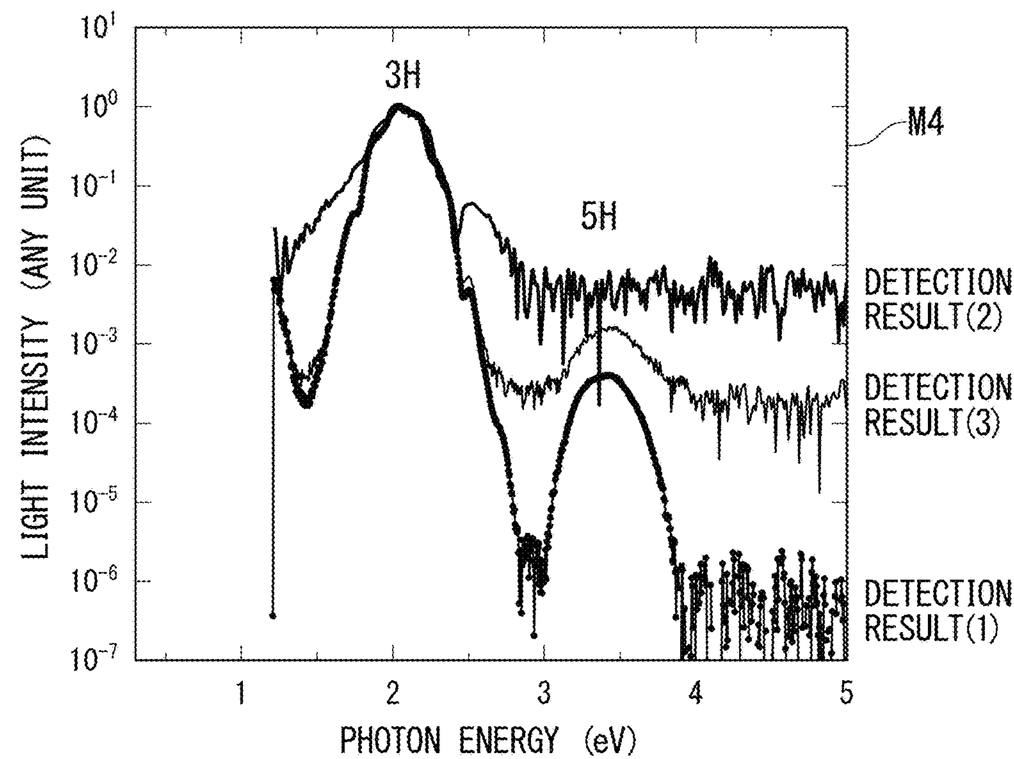
FIG. 8 shows an example of a measurement result from which stray light is removed.

FIG. 8 shows the fourth display image M4 (detection result (1)) of the light intensity of the component of the signal light R extracted finally. The detection result (1)

shows third-order (3H) and fifth-order (5H) harmonic components of $YBa_2Cu_3O_y$. FIG. 8 also shows a detection result (2) detected using only the Fourier spectroscopic unit 4 and a detection result (3) detected using only the wavelength dispersion spectroscopic unit 20 as comparative examples. In FIG. 8, a horizontal axis represents photon energy (eV), and a vertical axis represents a light intensity (any expressed unit) by logarithmic representation. As shown in the drawing, since a background component in the detection result (1) is reduced by two digits or more as compared to those in the detection result (2) and the detection result (3) before the stray light component is removed, it is easy to observe a 5H signal.

Figure 9:
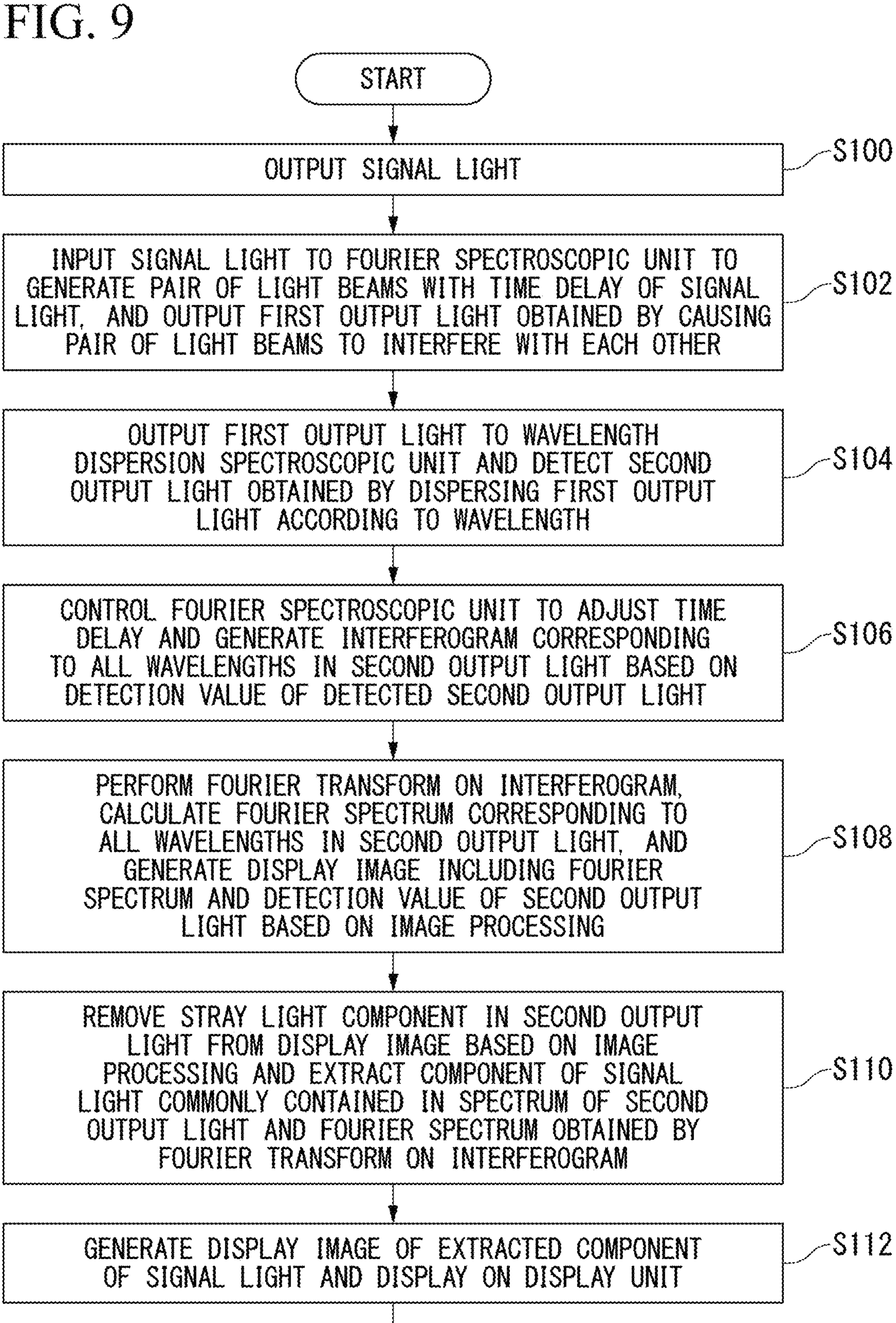
FIG. 9 is a flowchart showing a flow of processing of a spectroscopic method.

FIG. 9 is a flowchart showing processing executed in the spectroscopic device 1. The signal light R is output from the light source unit 2 (step S100). The signal light R is input to the Fourier spectroscopic unit 4 to generate the pair of light beams with any time delay, and the first output light F1 obtained by causing the pair of light beams to interfere with each other is output (step S102). The first output light F1 is input to the wavelength dispersion spectroscopic unit 20, and the second output light F2 obtained by dispersing the first output light F1 according to the wavelength is detected (step S104).

The control unit 12 controls the Fourier spectroscopic unit 4 to adjust the time delay, and generates an interferogram corresponding to all wavelengths in the second output light F2 based on the detection value of the detected second output light F2 (step S106). The control unit 12 performs Fourier transform on the interferogram, calculates the Fourier spectrum corresponding to all wavelengths in the second output light F2, and generates the display image including the Fourier spectrum and the detection value of the second output light F2 based on image processing (step S108). Based on the image processing, the control unit 12 removes the stray light component in the second output light F2 from the display image, and extracts the component of the signal light R commonly contained in the spectrum of the second output light F2 and the Fourier spectrum obtained by the Fourier transform on the interferogram (step S110). The control unit 12 generates the display image of the extracted component of the signal light R and displays the display image on the display unit 16 (step S112).

As described above, according to the spectroscopic device 1, the Fourier spectroscopic unit 4 and the wavelength dispersion spectroscopic unit 20 are disposed in series on the optical path, and thus a device configuration can be downsized. According to the spectroscopic device 1, since the wavelength dispersion spectroscopic unit 20 implemented by the multi-channel spectrometer that can perform spectrum measurement instantaneously is provided, it is possible to acquire an enormous amount of 2D data in a short time and extract the component of the signal light R in a short time based on calculation using the data.

According to the spectroscopic device 1, it is possible to perform interference spectroscopy with high accuracy by providing the interferometer (TWINS) that can perform a mechanical operation with high accuracy. According to the spectroscopic device 1, it is possible to extract the component of the signal light R generated from the sample (emitting substance) T within limited time in a narrow space by providing the Fourier spectroscopic unit 4 implemented by the TWINS.

Modification

Hereinafter, a modification to which the spectroscopic device 1 is applied will be described. In the following description, the same components as those in the above-described embodiment are denoted by the same names and reference numerals, and repeated description will be appropriately omitted.

The spectroscopic device 1 may be used as a Raman scattering spectroscopic device for detecting Raman scattered light generated from the sample T and evaluating physical properties such as polarizability, orientation, composition, strain, stress, and temperature of a substance. The Raman scattering spectroscopic device includes the light source unit 2, the Fourier spectroscopic unit 4, the wavelength dispersion spectroscopic unit 20, and the control device 10. The light source unit 2 emits the emission light P from the light source 3 to the sample (emitting substance T) and generates Raman scattered light (signal light R) from the sample T. The signal light R is input to the Fourier spectroscopic unit 4 to generate a pair of light beams with any time delay, and the first output light F1 obtained by causing the pair of light beams to interfere with each other is output. The wavelength n spectroscopic unit 20 disperses the received first output light F1 according to the wavelength and detects the second output light F2 including dispersed wavelength components. The control device 10 extracts a component of the Raman scattered light in the second output light F2 based on a detection result of the second output light F2. When the spectroscopic device 1 is used as the Raman scattering spectroscopic device, it is possible to evaluate the physical properties of the sample T by evaluating the Raman scattered light of the sample T after reducing an influence of stray light.

The spectroscopic device 1 may be used as a luminescence spectroscopic analysis device for measuring an elemental composition of the sample T such as a solid metal and performing quantitative analysis for determining an amount of a component in the sample T. Examples of luminescence include photoluminescence, discharge luminescence, electroluminescence, cathodoluminescence, radioluminescence, thermoluminescence, chemiluminescence, bioluminescence, stress luminescence, triboluminescence, and sonoluminescence. According to the luminescence spectroscopic analysis device, it is possible to measure the elemental composition of the sample T such as a solid metal, and to perform quantitative analysis for determining the amount of the component in the sample T by evaluating various types of luminescence generated from the sample T after reducing the influence of stray light.

For example, a case where the spectroscopic device 1 is used as a photoluminescence spectroscopic analysis device for performing quantitative analysis for determining the amount of the component in the sample T will be described. Here, photoluminescence is, for example, fluorescence and phosphorescence. The fluorescence is light emitted when a molecule in the sample T in a ground state is excited by applying energy and the excited molecule returns to the ground state. The phosphorescence is light emitted when an excited molecule returns to a ground state as intersystem crossing occurs when returning to the ground state. The photoluminescence spectroscopic analysis device includes the light source unit 2, the Fourier spectroscopic unit 4, the wavelength dispersion spectroscopic unit 20, and the control device 10. The photoluminescence spectroscopic analysis device measures, for example, fluorescence and phosphorescence generated from the sample T.

The light source unit 2 includes, for example, a device that emits excitation light (emission light P) to the sample T cooled by liquid nitrogen. The light source 3 is, for example, a xenon lamp. The light source unit 2 emits the excitation light to the sample T and generates photoluminescence (signal light R) on the sample T based on light emission. After the light emission, from the sample T, first emitted light of fluorescence is generated for a first time (about several tens of nanoseconds) and second emitted light of phosphorescence is generated for a second time (several milliseconds to several seconds) longer than the first time. While the emission light P is emitted to the sample T, the fluorescence and the phosphorescence are observed simultaneously.

The Fourier spectroscopic unit 4 simultaneously receives the first output light F1 including the first emitted light and the second emitted light after the light emission, generates a pair of light beams with any time delay, and outputs the first output light F1 obtained by causing the pair of light beams to interfere with each other. The first output light F1 includes a fluorescence component and a phosphorescence component.

The wavelength dispersion spectroscopic unit 20 disperses the received first output light F1 according to the wavelength and detects the second output light F2 including dispersed wavelength components. The control device 10 extracts a photoluminescence component including fluorescence and phosphorescence in the second output light F2 based on a detection result of the second output light F2. When the spectroscopic device 1 is used as the photoluminescence spectroscopic analysis device, by utilizing the fact that the emission time of the phosphorescence is longer than the emission time of the fluorescence, a signal of the phosphorescence may be separated and measured. For example, when the emission light P is continuously emitted from the light source unit 2 to the sample T, the sample T is in a state of emitting fluorescence and phosphorescence. In this state, when the control unit 12 performs control such as covering the light source unit 2 with a shutter and blocks the emission light P (excitation light), the sample T can be in a state of emitting only phosphorescence. In this state, the signal light R can contain only phosphorescence. When the control unit 12 performs control such as covering the light source unit 2 with a shutter, only the phosphorescence is input to the Fourier spectroscopic unit 4, and a signal of only the phosphorescence can be separated and measured. When the spectroscopic device 1 is used as the photoluminescence spectroscopic analysis device, it is possible to perform quantitative analysis for determining the amount of the component in the sample T by evaluating the photoluminescence generated from the sample T after reducing the influence of the stray light.

For example, a case where the spectroscopic device 1 is used as a discharge luminescence spectroscopic analysis device for measuring the elemental composition of the sample T such as a solid metal will be described. The discharge luminescence spectroscopic analysis device includes the light source unit 2, the Fourier spectroscopic unit 4, the wavelength dispersion spectroscopic unit 20, and the control device 10. In the discharge luminescence spectroscopic analysis device, for example, the light source unit 2 is disposed in an atmosphere of an inert gas such as argon gas. The light source unit 2 includes, for example, a discharge device (light source 3) that performs excitation discharge (emission light P) on the sample T formed of the solid metal. The light source unit 2 performs excitation discharge on the sample T, and generates discharge luminescence (signal light R) in the sample T, which is represented by an element-specific emission line spectrum. The Fourier spectroscopic unit 4 receives the discharge luminescence to generate a pair of light beams with any time delay and outputs the first output light F1 obtained by causing the pair of light beams to interfere with each other.

The wavelength dispersion spectroscopic unit 20 disperses the received first output light F1 according to the wavelength and detects the second output light F2 including dispersed wavelength components. The control device 10 extracts a discharge luminescence component in the second output light F2 based on a detection result of the second output light F2. When the spectroscopic device 1 is used as the discharge luminescence spectroscopic analysis device, it is possible to measure the elemental composition of the solid metal sample by evaluating the discharge luminescence of the sample T after reducing the influence of the stray light.

The spectroscopic device 1 may be used as a harmonic observation device that extracts harmonic component generated from the emitting substance T to observe light having a harmonic. The harmonic observation device includes the light source unit 2, the Fourier spectroscopic unit 4, the wavelength dispersion spectroscopic unit 20, and the control device 10. The light source unit 2 emits the emission light P from the light source 3 to the sample (emitting substance T) and generates a harmonic (signal light R) from the sample T. The harmonic is input to the Fourier spectroscopic unit 4 to generate a pair of light beams with any time delay, and the first output light F1 obtained by causing the pair of light beams to interfere with each other is output.

The wavelength dispersion spectroscopic unit 20 disperses the received first output light F1 according to the wavelength and detects the second output light F2 including dispersed harmonic wavelength components. The control device 10 extracts a harmonic component in the second output light F2 based on a detection result of the second output light F2. When the spectroscopic device 1 is used as the harmonic observation device, it is possible to observe the harmonic generated from the emitting substance T after reducing the influence of the stray light.

Although several embodiments of the present invention have been described, these embodiments are presented as examples and are not intended to limit the scope of the invention. These embodiments can be implemented in various other forms, and various omissions, substitutions, and changes can be made without departing from the gist of the invention. These embodiments and modifications thereof are included within the scope of the claims and equivalents thereof as well as within the scope and gist of the invention. An example is shown in which the spectroscopic device 1 applies the TWINS to the Fourier spectroscopic unit 4, and another interferometer may also be used as long as signal light can be input and a pair of light beams having a relative time difference can be coaxially output. Further, the spectroscopic device 1 may be implemented such that a mirror is provided at any position on an optical path to change a traveling direction of light for space saving. The spectroscopic device 1 is not limited to detection of Raman scattered light, luminescence, and a harmonic, and is applicable to all types of spectroscopic measurement in which weak light from a sample is detected using strong light such as a laser as a light source.

REFERENCE SIGNS LIST

1 spectroscopic device
2 light source unit
3 light source
4 Fourier spectroscopic unit
4A first polarization adjustment unit
4B delay unit

4C first adjustment unit
4E second polarization adjustment unit
10 control device
12 control unit
16 display unit
20 wavelength dispersion spectroscopic unit
23 spectroscopic element
25 detection unit
F1 first output light
F2 second output light
L optical axis
P1, P2 pair of light beams
P emission light
R signal light
T sample (emitting substance)

The invention claimed is:

1. A spectroscopic device comprising:

a light source unit configured to output signal light generated from a sample;

a Fourier spectroscopic unit configured to receive the signal light, generate a pair of light beams with any time delay, and output first output light obtained by causing the pair of light beams to interfere with each other;

a wavelength dispersion spectroscopic circuitry configured to input the first output light that is output from the Fourier spectroscopic unit, and detect second output light obtained by dispersing the received first output light according to a wavelength; and a control device configured to extract a component of the signal light in the second output light based on a detection result of the second output light, wherein the control device comprises:

a control unit configured to remove a stray light component and extract the component of the signal light in the second output light based on the detection result of the second output light, a display unit configured to display a display image in which the detection result is imaged and the component of the signal light is extracted based on image processing, and the control unit controls the Fourier spectroscopic unit, generates an interferogram corresponding to all wavelengths in the second output light based on a detection value of the second output light detected by adjusting the time delay, performs Fourier transform on the interferogram, calculates a Fourier spectrum corresponding to the all wavelengths in the second output light, generates a two-dimensional map based on image processing that plots the Fourier spectrum serving as a first axis and spectrum of the detection value of the second output light detected by the wavelength dispersion spectroscopic circuitry serving as a second axis, and extracts the component of the signal light from which the stray light component is removed based on a correlation between values along the first axis and the second axis in the two-dimensional map.

2. The spectroscopic device according to claim 1, wherein the Fourier spectroscopic unit comprises:

a first polarization adjustment circuitry configured to receive the signal light, adjust a polarization direction by applying a predetermined rotation angle in an oblique direction with respect to a polarization plane as viewed from an incident direction of the signal light, and output the signal light, a delay circuitry provided downstream of the first polarization adjustment circuitry, the delay circuitry being configured to apply a time delay to input light and output the input light, a first adjustment circuitry provided adjacent to and downstream or upstream of the delay circuitry, the first adjustment circuitry being configured to apply a relative time difference between a vertical component and a horizontal component of the input light and output light, and a second polarization adjustment circuitry provided downstream of the delay circuitry and the first adjustment circuitry, the second polarization adjustment circuitry being configured to receive the output light, allow passage of a component in an oblique direction with respect to the polarization plane as viewed from an incident direction of the output light, and generate and output the pair of light beams.

3. The spectroscopic device according to claim 1, wherein the wavelength dispersion spectroscopic circuitry comprises:

a spectroscopic element configured to disperse the first output light into light components of respective wavelengths, and a detection circuitry configured to individually detect intensities of the respective light components dispersed by the spectroscopic element.

4. A spectroscopic method comprising:

outputting, by a light source unit, a signal light generated from a sample;

inputting the signal light to a Fourier spectroscopic unit to generate a pair of light beams with any time delay, and outputting first output light obtained by causing the pair of light beams to interfere with each other;

inputting the first output light that is output from the Fourier spectroscopic unit to a wavelength dispersion spectroscopic circuitry to detect second output light obtained by dispersing the first output light according to a wavelength; and extracting, using a control device, a component of the signal light in the second output light based on a detection result of the second output light;

removing a stray light component and extracting the component of the signal light in the second output light based on the detection result of the second output light by the control device;

displaying a display image in which the detection result is imaged and the component of the signal light is extracted based on image processing; and controlling the Fourier spectroscopic unit, generating an interferogram corresponding to all wavelengths in the second output light based on a detection value of the second output light detected by adjusting the time delay, performing Fourier transform on the interferogram, calculating a Fourier spectrum corresponding to the all wavelengths in the second output light, generating a two-dimensional map based on image processing that plots the Fourier spectrum serving as a first axis and spectrum of the detection value of the second output light detected by the wavelength dispersion spectroscopic circuitry serving as a second axis, and extracting the component of the signal light from which the stray light component is removed based on a correlation between values along the first axis and second axis in the two-dimensional map.

5. The spectroscopic device according to claim 1, wherein the stray light component is a component having no correlation between the values along the first axis and the second axis in the two-dimensional map.

* * * * *